Nov. 24, 1970  D. THORNLEY  3,542,977
KEY OPERATED IGNITION SWITCHES FOR ROAD VEHICLES
Filed Nov. 27, 1968  3 Sheets-Sheet 1

INVENTOR
Derek Thornley
BY Holman, Glascock,
Downing & Seebold
ATTORNEYS

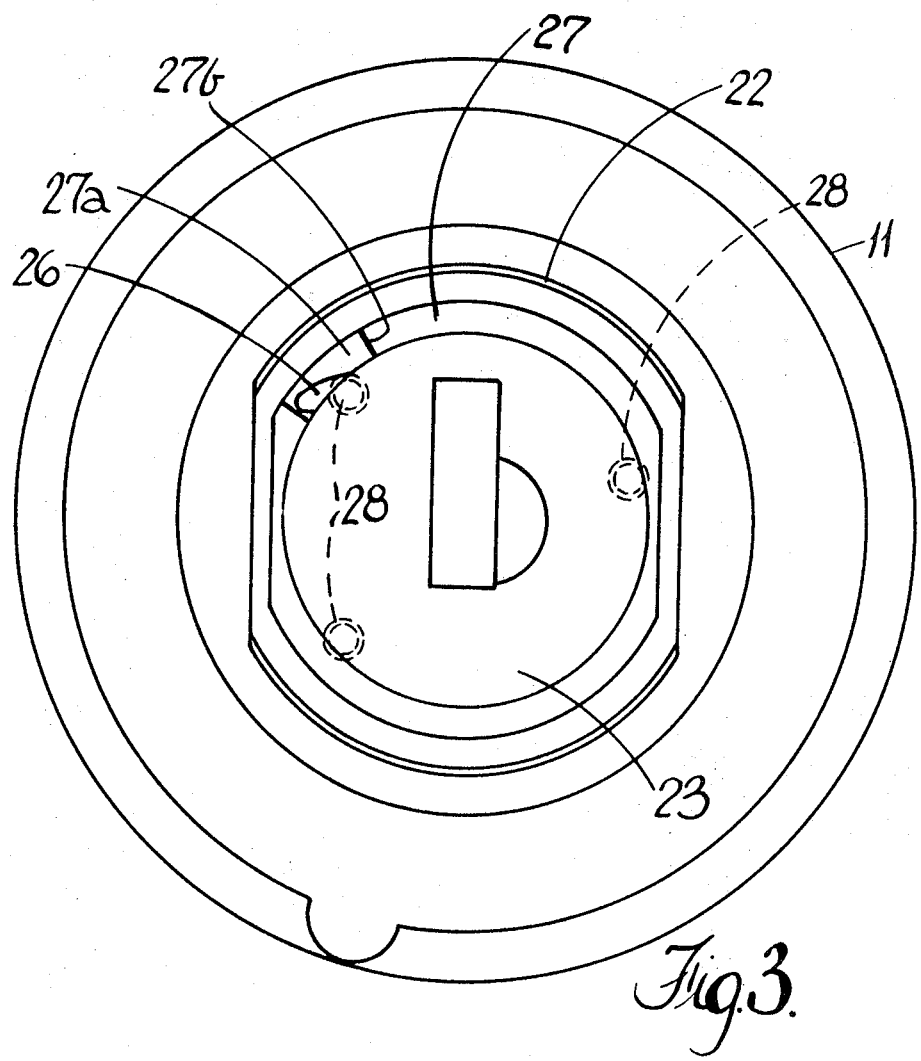

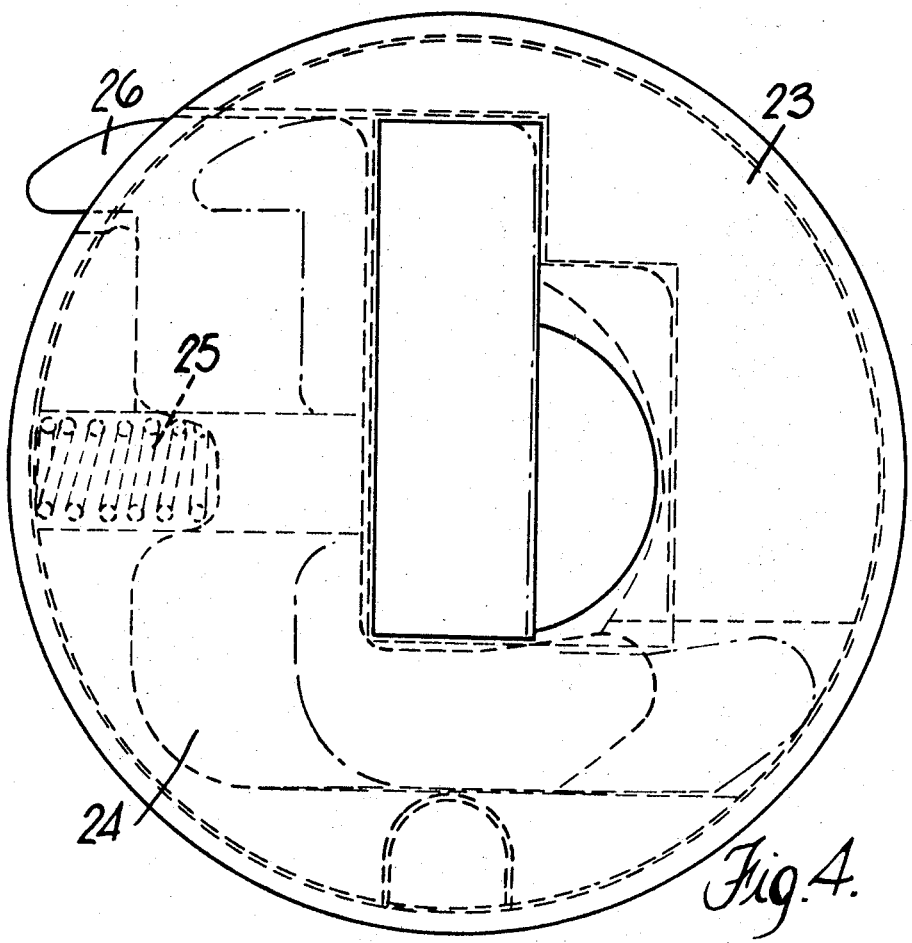
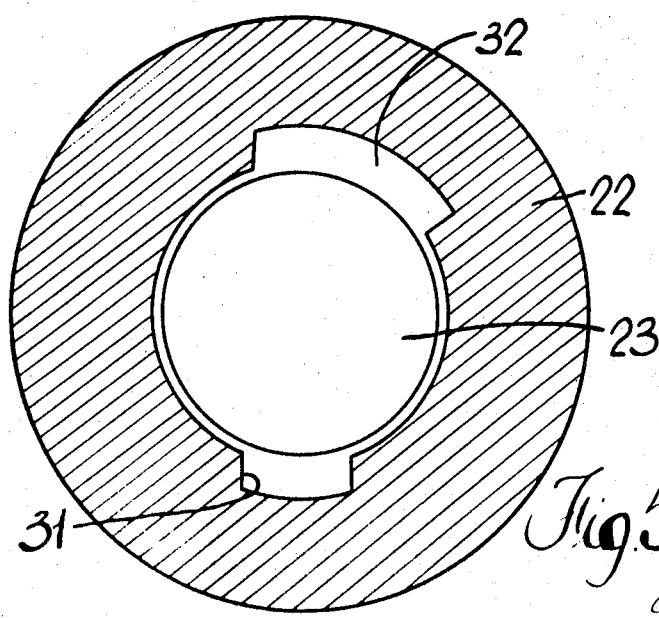

United States Patent Office 3,542,977
Patented Nov. 24, 1970

3,542,977
KEY OPERATED IGNITION SWITCHES FOR ROAD VEHICLES
Derek Thornley, Nelson, England, assignor to Joseph Lucas (Industries) Limited, Birmingham, England
Filed Nov. 27, 1968, Ser. No. 779,540
Claims priority, application Great Britain, Nov. 29, 1967, 54,286/67
Int. Cl. H01h 27/00
U.S. Cl. 200—44                                3 Claims

ABSTRACT OF THE DISCLOSURE

A key operated ignition switch for a road vehicle, wherein the rotor of the switch is resiliently urged from its on position towards its off position, and the key operated mechanism of the switch is adapted to permit removal of the operating key in the on position of the switch. The key operated mechanism includes means for preventing said rotor rotating from its on position to its off position until the key is removed from the key operated mechanism.

---

This invention relates to key operated ignition switches, for road vehicles, of the kind comprising a casing, a rotor rotatable in the casing between an off position and an on position wherein in use the ignition circuit of the vehicle is completed, and a key operated mechanism associated with said rotor by means of which the rotor is rotated.

According to the invention an ignition switch of the kind specified includes resilient means urging the rotor from its on position towards its off position and said key operated mechanism is adapted to permit removal of the operating key in the on position of the switch and includes means for preventing said rotor moving from its on position towards its off position until the key is removed from the key operated mechanism.

Figure 1:
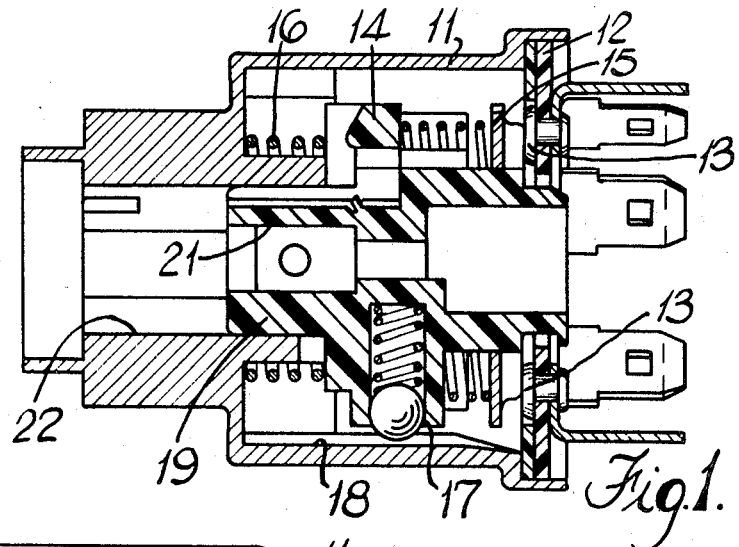
Figure 2:
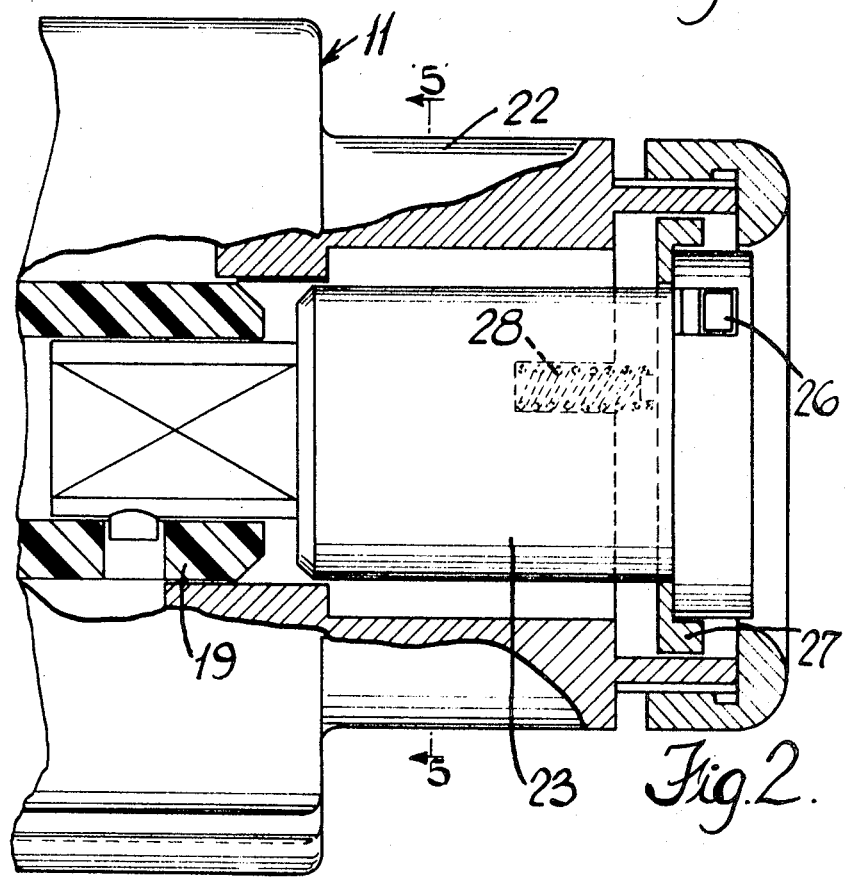

One example of the invention is illustrated in the accompanying drawings wherein, FIG. 1 is a sectional view of an ignition switch with its key operated mechanism omitted, FIG. 2 is a fragmentary sectional view of the switch shown in FIG. 1 but to a larger scale and showing the key operated mechanism in position, FIG. 3 is an end view of the switch shown in FIG. 2 with an end cover removed, FIG. 4 is an end view of the key operated mechanism shown in FIG. 3 but to a larger scale and showing certain internal part sin dotted lines, and FIG. 5 is a part sectional view on the line 5—5 in FIG. 2.

Referring to the drawings the ignition switch includes a stepped cylindrical casing 11 which is closed at one end by an insulating contact board 12 carrying fixed contacts 13. Mounted for rotation within the wider part of the casing is a rotor 14 which carries a movable contact plate 15. The rotor is movable in one direction from an off position to an auxiliary position wherein the contact plate 15 completes circuits between certain of the contacts 13 which in use are connected in the auxiliary circuit of the vehicle. Moreover, the rotor 14 is movable in the opposite direction from the off position to a position wherein in use the contact plate 15 completes the auxiliary and the ignition circuits of the vehicle and is movable further in the same direction to a position wherein the plate 15 completes the ignition circuit and the starter motor circuit of the vehicle.

The rotor 14 is urged by a torsion spring 16 from its start position through its ignition position to its off position and the rotor 14 and casing 11 are provided with cooperating detent means 17, 18 for maintaining the rotor in its off and its auxiliary positions. The rotor includes an axially extending spigot 19 which is received in the narrower part of the casing, the spigot 19 being provided with a bore 21 of noncircular cross-section. The bore 21 receives the end of the barrel 23 of a cylinder lock, the cylinder 22 of which is defined by the narrower part of the casing 11.

The barrel 23 of the lock is formed with an axially extending passage into which the operating key is inserted in use.

The outer end of the passage in the barrel 23 is closed, when the key is withdrawn from the barrel, by a plate 24 mounted inside the barrel for sliding movements across the outer end of said passage. The plate 24 is urged to its closed position by a spring 25 and moreover the plate 24 includes an integral finger 26 which is housed within the barrel 23 when the plate 24 is in its closed position but which extends through an aperture in the periphery of the barrel so as to project therefrom when the plate 24 is moved to its open position. The outer end of the passage in the barrel 23 is shaped to allow the key to be inserted into the passage and resiliently mounted for axial movement within the narrower part of the casing 11 and surrounding the barrel 23 is a cam ring 27 with which the finger 26 coacts when the plate 24 is in its open position. The cam ring 27 is held against rotation relative to the casing 11 by coacting surfaces on the ring 27 and the casing 11.

The operation of the ignition switch is as follows. Assuming that the switch is locked in its off position, the key being withdrawn from the barrel 23, then in order to start the engine of the vehicle in which the switch is fitted, the key is inserted into the barrel of the lock. When the key is inserted into the barrel 23 the barrel becomes free to rotate and the plate 24 is moved against the action of the spring 25 to its open position wherein the finger 26 projects from the barrel 23 to engage the cam ring 27. The key is then rotated to move the rotor 14 through the ignition position to the start position to energise the starter motor of the vehicle. As the switch is moved through the ignition position the finger 26 engages and rides over a ramp surface 27a on the cam ring 27 the cam ring 27 being moved axially against the action of springs 28 to allow the finger 26 to ride over the ramp surface 27a. When the finger 26 clears the axially extending shoulder at the end of the ramp surface the cam ring 27 is returned to its original position by the springs 28.

When the engine of the vehicle has started the key is released and under the influence of the spring 16 the rotor and consequently the barrel 23 are moved back towards the off position. However, as the barrel 23 reaches the ignition position the finger 26 engages an axially extending shoulder 27b defined by the end of the ramp surface 27a and the movement of the rotor 14 towards the off position is arrested at the ignition position. In order to switch off the engine of the vehicle the key is withdrawn from the barrel 23 whereupon the plate 24 is moved by the spring 25 to its closed position thereby disengaging the finger 26 from the cam ring 27 and allowing the spring 16 to return the rotor to its off position, wherein the ignition circuit is broken.

The construction of the cylinder lock defined by the barrel 23 and the cylinder 22 is as follows. The barrel 23 is of conventional construction having a plurality of wards (not shown) which are spring urged downwardly so as to project from the lowermost part of the barrel 23 and which are lifted so that their ends are flush with the periphery of the barrel 23 by a key having a serrated edge. In the off position of the switch, when the key is removed from the barrel 23 the wards project downwardly from the barrel 23 into an axially extending channel 31 in the wall of the cylinder 23, the circumferential width of the channel 31 being equal to the width of the wards so that the barrel 23 is held against rotation. When the key is inserted into the barrel 23 the wards are lifted out of the channel 31 and since each ward is moved to a position wherein its ends are flush with the surface of the barrel 23 only by one particular portion of the serrated edge of the key, then some of the wards will be lifted momentarily to a position wherein they project from the uppermost part of the barrel 23 as the key is inserted. Thus to accommodate the upward projection of the wards a further axially extending channel 32 is formed in the wall of the cylinder 22. When the key is fully inserted into the barrel 23 the barrel can be rotated to operate the switch. It will be appreciated that when the key is withdrawn from the barrel 23 some of the wards are again caused to project from the uppermost part of the surface of the barrel 23. Thus so that the key can be withdrawn when the switch is in its ignition position the channel 32 is extended circumferrentially, it being appreciated that the channel 31 is not similarly extended since the wards are never moved downwardly by the key. When the key is withdrawn the wards are held flush with the periphery of the barrel 23 against the action of their springs, by engagement with the wall of the cylinder 22 until the barrel is rotated by the spring 16 to its off position wherein the wards enter the channel 31 to lock the barrel 23 against rotation.

In a modification the cam 27 is integral with the cylinder 22 of the lock, and the plate 24 is capable of both radial and tilting movement relative to the barrel 23 against the action of a spring. Thus during operation of the switch the finger 26 moves generally axially as it rides over the ramp surface 27a, as permitted by tilting movement of the plate 24, the finger 26 then being returned to its original position when the finger 26 clears the end of the ramp 27a. The remainder of the operation is similar to that described above.

Having thus described my invention what I claim as new and desire to secure by Letters Patent is:

1. A key operated ignition switch, for a road vehicle, including,
   a casing,
   a rotor rotatable in the casing between an off position and an on position in which the ignition circuit of the vehicle is completed in use,
   a cylinder lock barrel,
   means mounting said cylinder lock barrel in a lock cylinder, the lock cylinder being constituted by part of the switch casing,
   means coupling the cylinder lock barrel to said rotor so that said rotor is rotated with said barrel,
   resilient means urging the rotor from said on position towards said off position,
   means permitting removal of an operating key from said cylinder lock barrel in the on position of the switch,
   a cam nonrotatably mounted relative to said cylinder lock barrel,
   a cam follower part, and,
   means mounting said part for movement relative to the cylinder lock barrel on insertion of said operating key into said cylinder lock barrel, said part being moved, by insertion of said key into said barrel, to a position wherein said part is engageable with said cam, said cam and said part being such that as said barrel is rotated from the off position to the on position said part rides over the cam, while during rotation of the barrel through the on position towards the off position said part engages the cam in a manner to prevent rotation of the barrel from the on position towards the off position, until said part is disengaged from the cam by removal of said key from the cylinder lock barrel.

2. A switch as claimed in claim 1 wherein said cam is mounted for axial movement relative to the barrel against the action of resilient means and includes a ramp surface defining an axially extending shoulder at one end thereof, and said part is movable outwardly relative to the barrel, against the action of further resilient means, by insertion of the key into the barrel, said part riding over said ramp surface during rotation of the barrel from the off position to the on position, as permitted by said axial movement of the cam, and said part engaging said shoulder in the on position of the barrel to retain the barrel in the on position until said part is withdrawn radially from said shoulder by said further resilient means upon withdrawal of said key from the barrel.

3. A switch as claimed in claim 1 wherein said cam is fixed relative to the barrel and includes a ramp surface defining an axially extending shoulder at one end thereof and said part is movable outwardly and generally axially relative to the barrel against the action of resilient means, said part being moved outwardly by insertion of the key into the barrel, and riding over said ramp surface during rotation of the barrel from the off position to the on position, as permitted by said generally axial movement of the part, and said part engaging said shoulder in the on position of the barrel to retain the barrel in the on position until said part is withdrawn radially from said shoulder by said resilient means upon withdrawal of said key from the barrel.

References Cited
UNITED STATES PATENTS

| | | | |
|---|---|---|---|
| 2,767,278 | 10/1956 | Collins | 200—44 |
| 3,138,780 | 6/1964 | Jacobson | 200—44 X |
| 3,218,401 | 11/1965 | Root | 200—44 X |

ROBERT K. SCHAEFER, Prmary Examiner

H. J. HOHAUSER, Assistant Examiner